Aug. 6, 1946.  G. C. GORDON ET AL  2,405,205
BEET HARVESTER
Filed Sept. 26, 1944
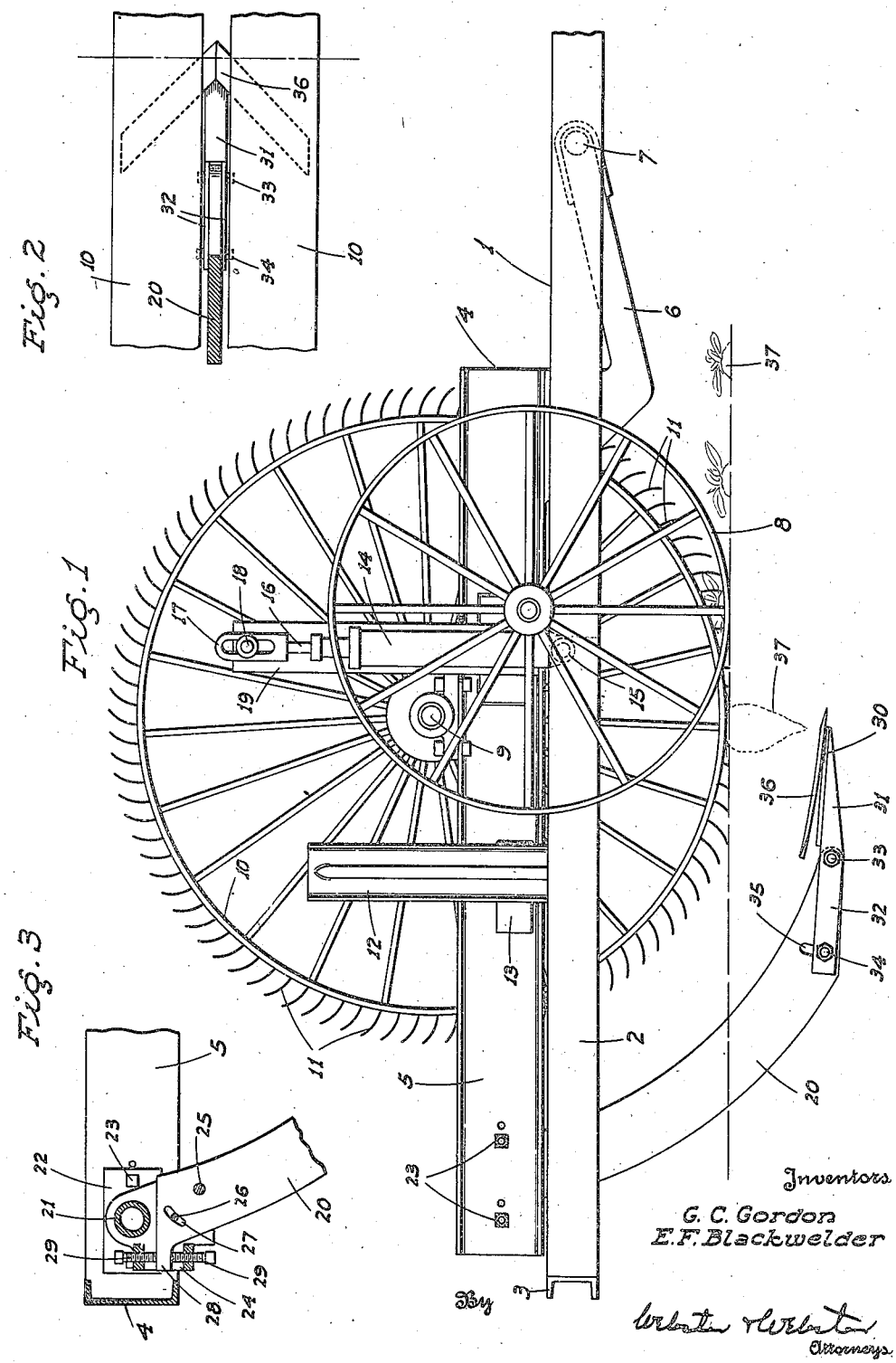
Inventors
G. C. Gordon
E. F. Blackwelder
By
Webster & Webster
Attorneys

Patent document

Patented Aug. 6, 1946

2,405,205

UNITED STATES PATENT OFFICE 2,405,205

BEET HARVESTER

George C. Gordon and Ernest F. Blackwelder, Rio Vista, Calif., assignors of twenty-one and one-fourth per cent to Claude A. Loucks, thirty-six and one-fourth per cent to Lloyd K. Schmidt, twenty-one and one-fourth per cent to Albert M. Jongeneel, and twenty-one and one-fourth per cent to George P. Du Bose Application September 26, 1944, Serial No. 555,774

6 Claims. (Cl. 55—108)

This invention relates in general to improvements in the type of beet harvester shown in United States Patent No. 2,350,173, dated May 30, 1944.

One of the objects of this invention is to provide, in a beet harvester as above, a pair of spiked beet engaging and pick-up wheels mounted on a common transverse shaft which in turn is carried by a pivotally mounted floating sub-frame which trails relative to its pivot whereby said wheels, which ride atop adjacent parallel beet rows, may simultaneously rise and fall with the ground contour.

Another object of the invention is to incorporate in a dual pick-up wheel beet harvester, as in the preceding paragraph, a novel form of sub-soil plow which runs in the earth below and in common relationship to both of said wheels, whereby the suction of said plow holds the dual wheels in close ground engagement for the wheel spikes to effectively impale beets in the corresponding rows, and then loosens the soil about such beets to permit of their ready lifting from the ground on said wheels.

A further object of the present invention is to provide an effective power mechanism to positively raise the pivotally mounted sub-frame and dual, spiked wheels above the ground for transport of the implement from place to place; such power mechanism being arranged so that when released and the sub-frame lowered so that the wheels are in ground contact, subsequent up and down floating motion thereof do not produce any complementary movement of the parts of said mechanism—which includes hydraulic cylinders. Any such complementary movement would be undesirable due to the continued wear producing action on such hydraulic cylinders which would occur.

A further object of the invention is to produce a simple and inexpensive device, and yet one which will be exceedingly effective for the purpose for which it is designed.

These objects are accomplished by means of such structure and relative arrangement of parts as will fully appear by a perusal of the following specification and claims.

In the drawing similar characters of reference indicate corresponding parts in the several views:

Figure 1 is a fragmentary side elevation of a beet harvester embodying the present invention.

Figure 2 is a fragmentary plan view, somewhat diagrammatic, illustrating the position of the plow standard and the sub-soil plow relative to the dual, spiked pick-up wheels which the implement includes.

Figure 3 is a fragmentary sectional elevation showing the manner of adjustably mounting the plow standard in connection with the rear end portion of the sub-frame of the implement.

Referring now more particularly to the characters of reference on the drawing, the present invention is intended to be incorporated in a beet harvester comprising substantially the assembly shown in the above identified United States Patent No. 2,350,173, dated May 30, 1944, and which implement includes a main frame 1 having transversely spaced rigid side beams 2 connected together at their rear ends by a cross beam 3. At its forward end the main frame 1 includes a hitch (not shown) for connection in draft relation with a tractor.

Between the side beams 2 the implement includes a vertically swingable sub-frame 4 having transversely spaced side beams 5 rigidly connected together at the ends; said sub-frame including transversely spaced, forwardly projecting swing arms 6 which are pivotally connected at their forward ends, for vertical swinging movement, to a cross shaft 7 which extends between the side beams 2 of the main frame 1 some distance ahead of a pair of transversely spaced ground engaging wheels 8 which are journaled in connection with side beams 2 and support said main frame 1 for movement along the ground.

Slightly to the rear of the axis of wheels 8, the sub-frame 4 carries a cross shaft 9 on which a pair of relatively large-diameter, wide-faced wheels 10 are mounted in spaced relation, the spacing of said wheels being substantially equal to the spacing of the beet rows to be harvested. In practice the wheels 10 are adjustable axially to vary the spacing thereof, as working conditions may dictate. The wheels 10 include, on the face thereof, a plurality of transversely spaced, circumferentially extending rows of outwardly projecting spikes 11 whose arrangement on said wheels is the same as in the above identified patent.

In order to prevent any lateral deflection of the floating sub-frame 4, and to guide vertical movements thereof, rigid upstanding guide posts 12 are fixed on the side beams 2, and shoes 13 frictionally and slidably engage adjacent faces of the posts 12.

The power mechanism which is employed to raise the sub-frame 4 and supported dual wheels 10 from the ground for transport of the implement from place to place, comprises fluid-pressure actuated power cylinders 14 pivotally mounted at their lower ends, as at 15, on the side beams 2; such power cylinders upstanding from the corresponding side beams 2 and including upwardly projecting piston rods 16. At the upper and outer end each piston rod 16 is fitted with a vertically slotted head 17, in the slot of which rides a pin 18 fixedly mounted on and projecting laterally out from a vertical post 19 secured at its lower end to the corresponding side beam 5 of sub-frame 4.

The power cylinders 14 are energized through the medium of fluid-pressure conduits (not shown); the fluid pressure being obtained from a valve-controlled mechanism on the tractor.

When the implement is in use, with the power cylinders inactive and the piston rods 16 consequently lowered, the pins 18 ride intermediate the ends of corresponding slots in heads 17, whereby the sub-frame 4 and wheels 10 may float up and down without producing any complementary movement of the piston rods 16, and which complementary movement would be undesirable due to the wear-producing action on said power cylinders.

The sub-soil plow assembly for the dual, spiked-wheel assembly of the implement comprises the following:

A depending and forwardly curved plow standard 20 is mounted at its upper end in connection with the sub-frame 4; said standard being disposed in a vertical plane which extends centrally between the wheels 10. The connection between the upper end of plow standard 20 and sub-frame 4 comprises a tubular cross member 21 having attachment plates 22 on the ends thereof, with said plates engaging corresponding side beams 5 of sub-frame 4 on their inner faces. The attachment plates 22 are attached to side beams 5 by bolts 23, and, as illustrated, said plates are adjustable lengthwise of the implement.

Transversely spaced guide plates 24 are fixed on cross member 21 and depend therefrom, the upper end of plow standard 20 projecting between said guide plates and being carried on a pivot pin 25 which extends therebetween. Another pin 26, extending between said plates 24, rides in an arcuate slot 27 concentric to pin 25 whereby to limit the extent of vertical swinging movement of plow standard 20. At its upper end said plow standard 20 includes a rearwardly projecting ear 28 which is engaged between opposed vertical adjustment screws 29; adjustment of the screws 29 producing a corresponding adjustment, either up or down, of the lower end of the plow standard 20 which carries the sub-soil plow, indicated generally at 30, and which comprises in detail the following:

The plow includes a shank 31 forked at its rear end, as at 32. The lower end of plow standard 20 extends into the fork 32 and is pivoted in connection with the forward end thereof, as at 33. The fork 32 is locked to the plow standard 20 in any selected position of adjustment by a lock bolt 34 which projects between the legs of the fork through a slot 35 in said standard, the slot 35 being concentric to the pivot 33.

The shank 31 projects forwardly some distance from the pivot 33 and such forwardly projecting portion of the shank has mounted thereon a V-shaped, upwardly facing plow blade or share 36, the legs of which diverge rearwardly at an upward incline; said legs also being canted downwardly somewhat toward their leading edges, with said leading edges sharpened. The plow 30 normally rides in the ground in a horizontal plane slightly below beets 37 in the rows, with the tip or leading end of the plow blade 36 extending forwardly to at least, and preferably slightly beyond, the vertical center line of the wheels 10.

When the implement is in use, with the dual spiked pick-up wheels 10 riding atop corresponding beet rows, the suction of plow 36 acts—in common relationship to both of said wheels—to maintain the same firmly in ground engagement so that the wheel spikes effectively impale beets in said rows. With continued advancement of the implement the divergent upwardly and rearwardly inclined legs of plow blade 36 loosen the soil about the beets 37 to facilitate withdrawal or lifting of the latter by the wheels 10. As the leading end or tip of plow blade 36 is well advanced, the legs of plow blade 36 disturb the earth before any substantial lifting action on the beets 37 by the wheels 10, as is desirable for obvious reasons.

The plow standard 29 can be adjusted either lengthwise of the implement or vertically, and the inclination or suction of the plow 30 can likewise be adjusted, all for the purpose of properly and precisely setting said plow 30 in its working position.

The beets 37, after being lifted from the ground, are topped and discharged from the implement by means substantially as shown in the above identified patent.

It is to be understood that the identified United States Patent No. 2,350,173 discloses a beet harvester which includes only a single pick-up wheel, whereas the present implement embodies dual pick-up wheels in side by side relation as described.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent is:

1. A beet harvester including a main frame supported for movement along the ground, a floating sub-frame on the main frame, a pair of spiked, beet pick-up wheels journaled in transversely spaced relation on the sub-frame for movement therewith, and a single sub-soil plow mounted in rigid connection with the sub-frame in symmetrical relation to and below said transversely spaced wheels; said plow including rearwardly divergent portions, said portions cooperating with corresponding wheels to loosen the earth therebeneath.

2. A beet harvester including a main frame supported for movement along the ground, a floating sub-frame on the main frame, a pair of spiked, beet pick-up wheels journaled in transversely spaced relation on the sub-frame for movement therewith, and a single sub-soil plow mounted in rigid connection with the sub-frame in symmetrical relation to and below said transversely spaced wheels; said plow being of V-shape in plan with the legs thereof extending in upwardly inclined, rearwardly divergent relation for cooperation with corresponding wheels to loosen the earth about beets impaled on said wheels.

3. A beet harvester as in claim 2 in which the point of said plow extends forwardly to at least the vertical center line of the wheels.

4. A beet harvester including a main frame supported for movement along the ground, a floating sub-frame on the main frame, a pair of spiked, beet pick-up wheels journaled in transversely spaced relation on the sub-frame for movement therewith, a plow standard mounted on the sub-frame rearwardly of and in a plane centrally between said wheels, said standard extending forwardly and downwardly, and a single, sub-soil plow mounted in rigid connection with the standard at its lower end in symmetrical and cooperative relation to and below said wheels; said standard being mounted on the sub-frame for adjustment vertically, as well as lengthwise of the implement.

5. A beet harvester including a main frame supported for movement along the ground, a floating sub-frame on the main frame, a pair of spiked, beet pick-up wheels journaled in transversely spaced relation on the sub-frame for movement therewith, a plow standard mounted on the sub-frame rearwardly of and in a plane centrally between said wheels, said standard extending forwardly and downwardly, and a single, sub-soil plow mounted in rigid connection with the standard at its lower end in symmetrical and cooperative relation to and below said wheels; said plow being mounted on the standard for adjustment of the suction of said plow.

6. A beet harvester including a main frame supported for movement along the ground, a floating sub-frame on the main frame, a pair of spiked, beet pick-up wheels journaled in transversely spaced relation on the sub-frame for movement therewith, a plow standard mounted on the sub-frame rearwardly of and in a plane centrally between said wheels, said standard extending forwardly and downwardly, and a single, sub-soil plow mounted in rigid connection with the standard at its lower end in symmetrical and cooperative relation to and below said wheels; said plow including a rearwardly projecting shank forked at its rear end portion, the standard engaging in the shank fork, and elements detachably and adjustably connecting the standard and fork.

GEORGE C. GORDON.
ERNEST F. BLACKWELDER.